United States Patent
Shigyou et al.

(10) Patent No.: US 12,435,798 B2
(45) Date of Patent: Oct. 7, 2025

(54) DIAPHRAGM VALVE AND FLOW RATE CONTROL DEVICE

(71) Applicant: FUJIKIN INCORPORATED, Osaka (JP)

(72) Inventors: Kohei Shigyou, Osaka (JP); Takashi Hirose, Osaka (JP); Takahiro Matsuda, Osaka (JP); Kazunari Watanabe, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 50 days.

(21) Appl. No.: 18/576,172

(22) PCT Filed: Jun. 8, 2022

(86) PCT No.: PCT/JP2022/023054
§ 371 (c)(1),
(2) Date: Jan. 3, 2024

(87) PCT Pub. No.: WO2023/032393
PCT Pub. Date: Mar. 9, 2023

(65) Prior Publication Data
US 2024/0229941 A1 Jul. 11, 2024

(30) Foreign Application Priority Data
Aug. 31, 2021 (JP) ................... 2021-141486

(51) Int. Cl.
*F16K 7/14* (2006.01)
*F16K 27/02* (2006.01)
*F16K 31/00* (2006.01)

(52) U.S. Cl.
CPC ............ *F16K 7/14* (2013.01); *F16K 27/0236* (2013.01); *F16K 31/007* (2013.01)

(58) Field of Classification Search
CPC ........ F16K 7/14; F16K 27/0236; F16K 31/007
See application file for complete search history.

(56) References Cited

U.S. PATENT DOCUMENTS

| 5,669,408 A | 9/1997 | Nishino et al. |
| 5,791,369 A | 8/1998 | Nishino et al. |
| (Continued) | | |

FOREIGN PATENT DOCUMENTS

| CN | 103967912 A | 8/2014 |
| JP | H08-338546 A | 12/1996 |
| (Continued) | | |

OTHER PUBLICATIONS

International Search Report in International Patent Application No. PCT/JP2022/023054, dated Jul. 12, 2022, along with an English translation thereof.

*Primary Examiner* — Hailey K. Do
(74) *Attorney, Agent, or Firm* — Greenblum & Bernstein, P.L.C.

(57) ABSTRACT

A diaphragm valve, which is miniaturized while ensuring a required flow rate and has improved assemble workability and maintainability, includes a body defining a flow path; a diaphragm provided on a bottom surface of an accommodation recess; a fixing ring screwed with a screw portion formed on an inner peripheral surface of the accommodation recess to fix the diaphragm to the body; a stacked piezoelectric actuator; a support plate supporting the stacked piezoelectric actuator; a cylindrical actuator cover holding a diaphragm presser and configured to transmit the piezoelectric displacement of the stacked piezoelectric actuator while accommodating the stacked piezoelectric actuator inside; and a fixing member screwed with the common screw portion and cooperating with the fixing ring to fix the position of the support plate in the accommodation recess.

8 Claims, 9 Drawing Sheets

(56) References Cited

U.S. PATENT DOCUMENTS

| | | | |
|---|---|---|---|
| 9,625,047 B2 * | 4/2017 | Hirose | F16K 31/007 |
| 10,767,789 B2 * | 9/2020 | Shugrue | F16K 7/16 |
| 10,876,641 B2 * | 12/2020 | Iizuka | F16K 31/1225 |
| 11,339,881 B2 * | 5/2022 | Watanabe | H01L 21/02 |
| 2016/0047483 A1 | 2/2016 | Hirose et al. | |
| 2020/0370664 A1 | 11/2020 | Watanabe et al. | |

FOREIGN PATENT DOCUMENTS

| | | |
|---|---|---|
| JP | 2014-190387 A | 10/2014 |
| JP | 6799859 B2 | 12/2020 |
| WO | WO2019/167711 A1 | 9/2019 |

* cited by examiner

[fig.1A]
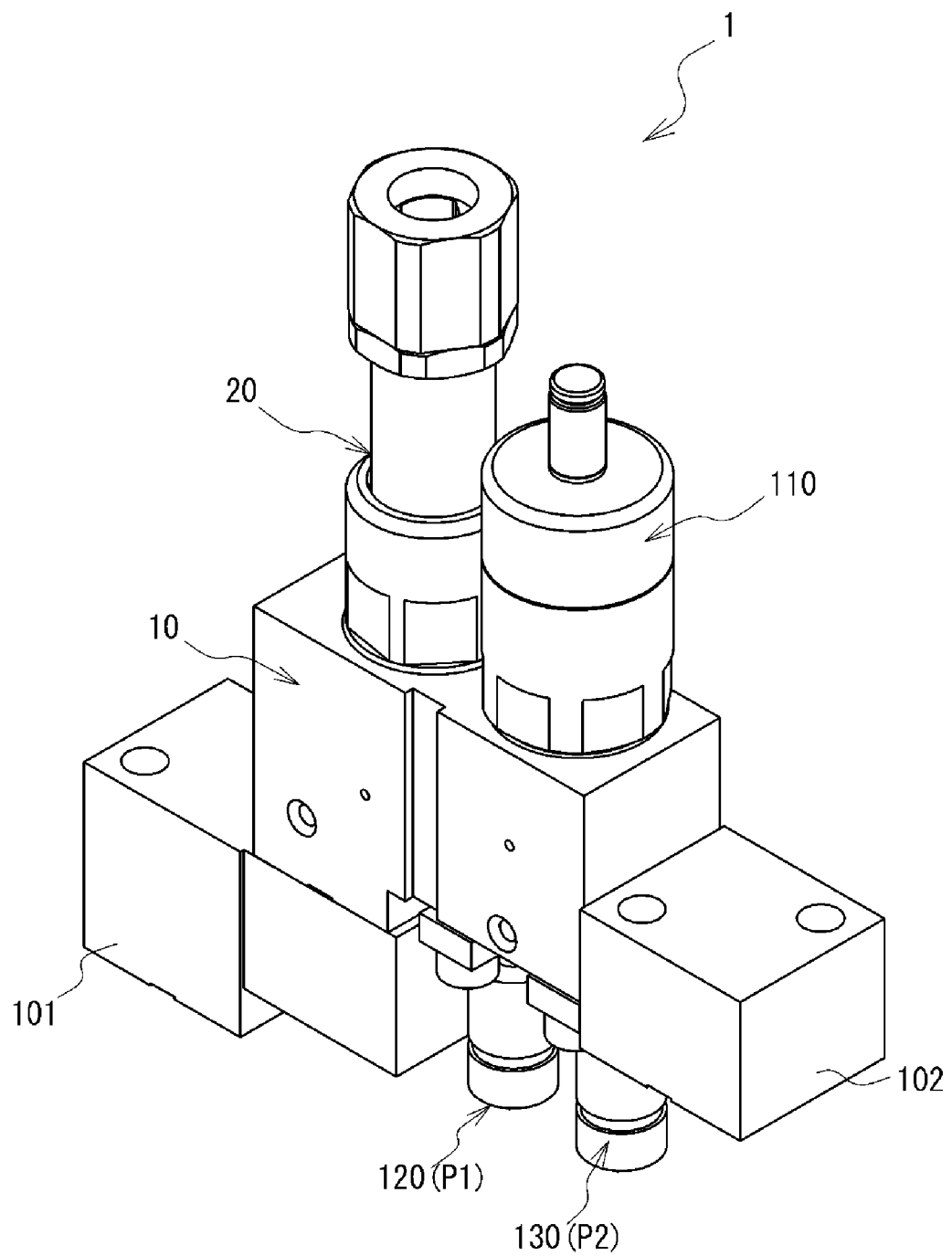

[fig.1B]
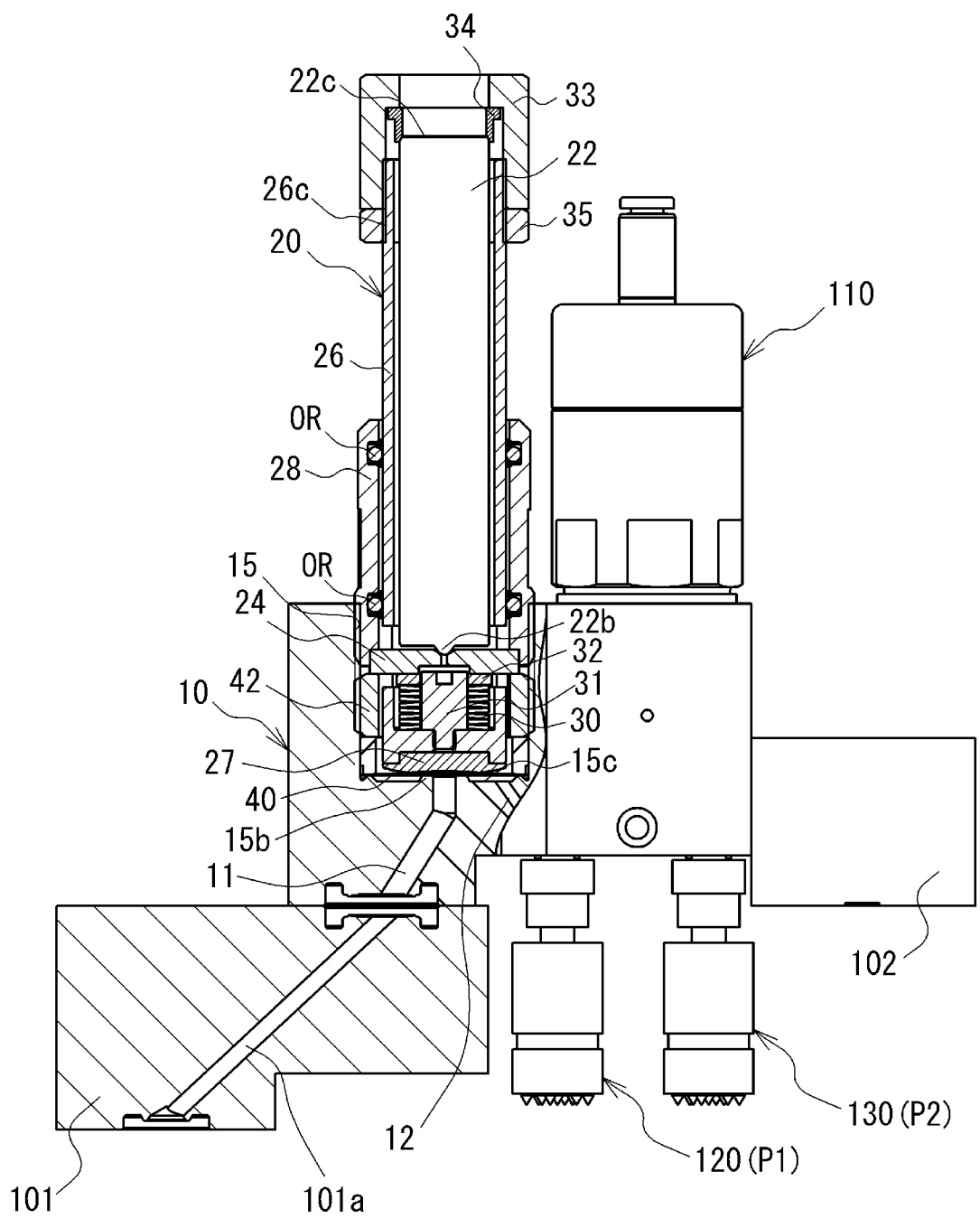

[fig.1C]
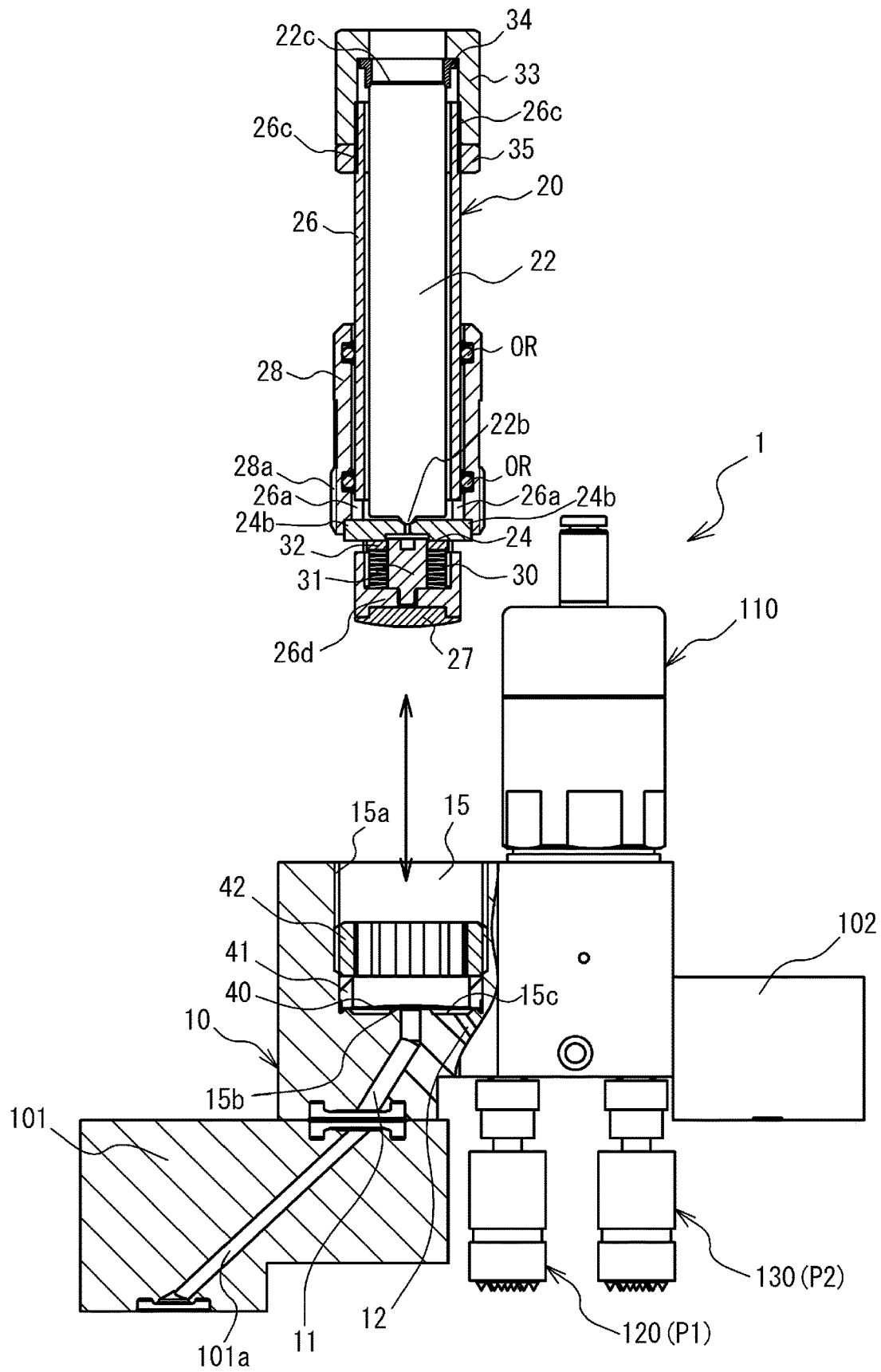

[fig.2]
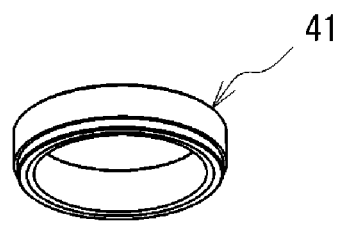
[fig.3A]
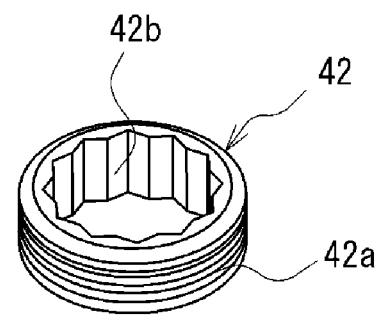
[fig.3B]
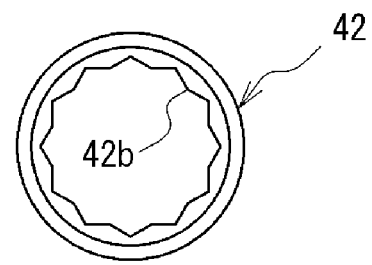

[fig.4]
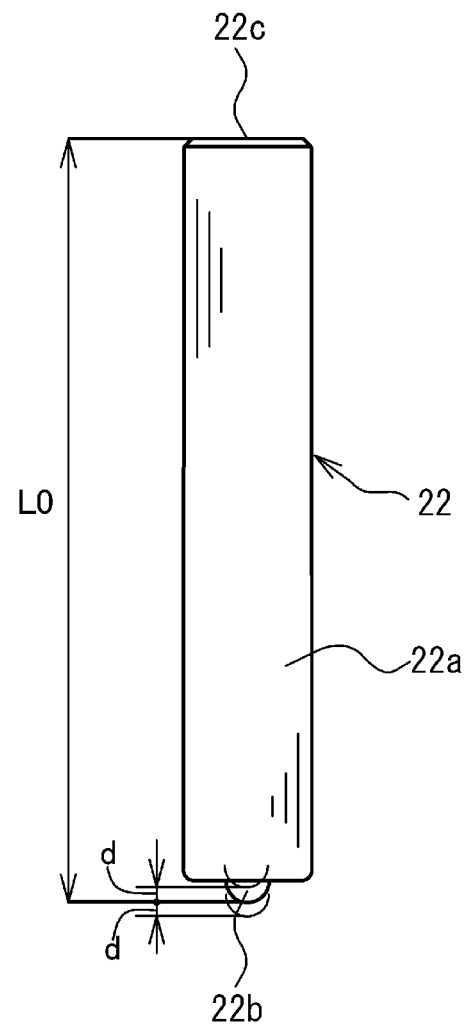
[fig.5A]
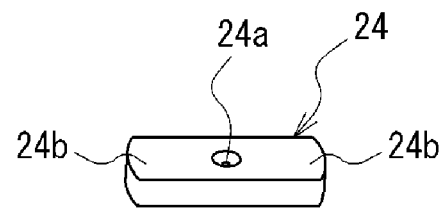

[fig.5B]
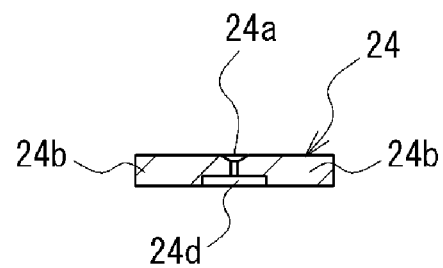
[fig.6A]
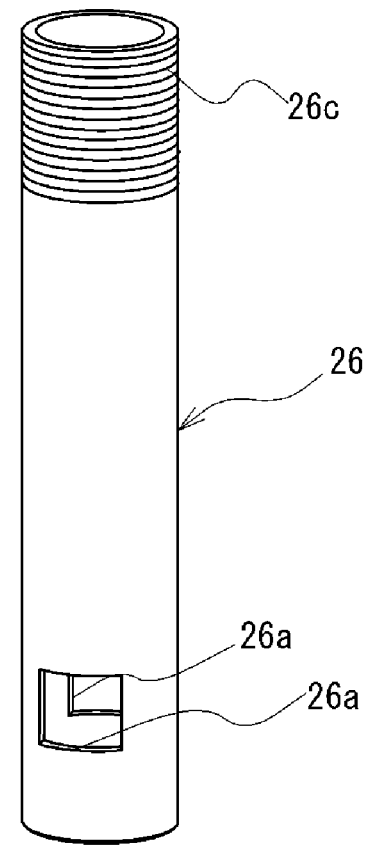

[fig.6B]
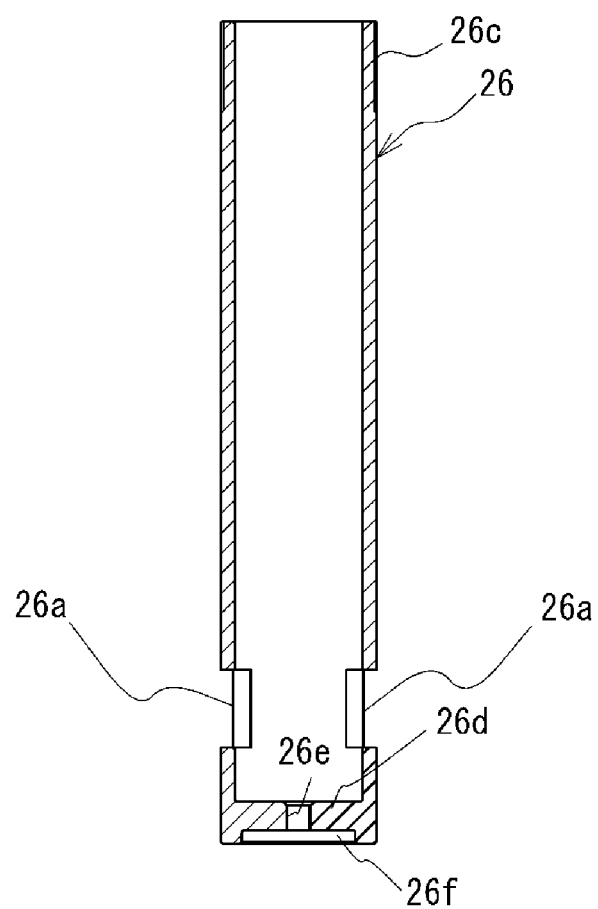

[fig.6C]
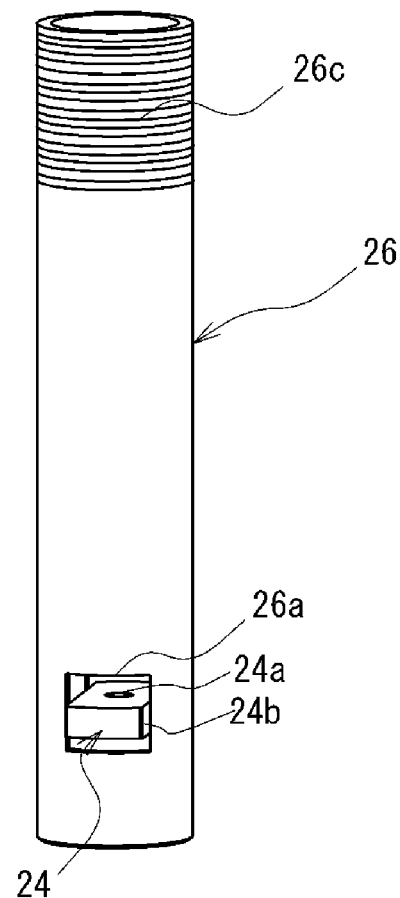
[fig.7A]
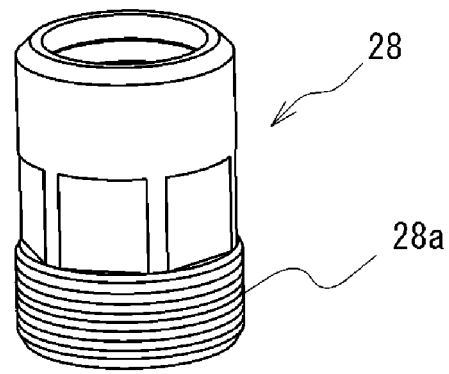

[fig.7B]
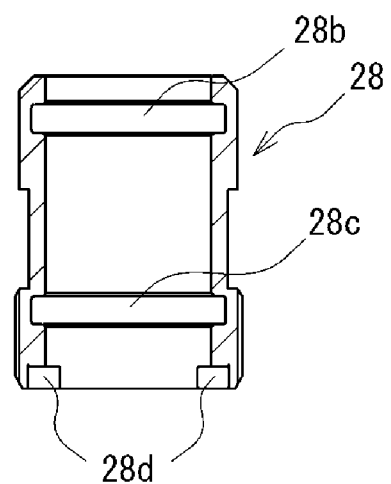

DIAPHRAGM VALVE AND FLOW RATE CONTROL DEVICE

TECHNICAL FIELD

The present invention relates to a diaphragm valve and a flow rate control device using the diaphragm valve as a flow rate control valve.

BACKGROUND ART

In a semiconductor manufacturing process, especially in micro processes such as Atomic Layer Deposition, a pressure-type flow rate control device such as that disclosed in Patent Literature 1 or the like is used to supply precisely measured process gases to a process chamber.

The flow rate control device disclosed in Patent Literature 1 controls the flow rate of a fluid by operating a diaphragm with a stacked piezoelectric actuator in which stacked piezoelectric elements are housed in a casing to adjust the opening degree of a flow path.

PATENT LITERATURE

PTL 1: Japanese Patent No. 6799859

SUMMARY OF INVENTION

Technical Problem

In a flow rate control device as described above, while miniaturization and thinning are required, it is also required to secure a flow rate of a fluid. There is also a need to improve assemble workability and maintainability of the flow rate control device.

One of the objects of the present invention is to provide a diaphragm valve which is miniaturized while ensuring a required flow rate, and which has improved assemble workability and maintainability, and a flow rate control device using the diaphragm valve.

Solution to Problem

A diaphragm valve of the present invention comprises:
a body having a block shape and defining a flow path;
a diaphragm provided on a bottom surface of an accommodation recess formed in the body and configured to change an opening degree of the flow path while defining a part of the flow path;
a fixing ring screwed with a screw portion formed on an inner peripheral surface of the accommodation recess to fix the diaphragm to the body;
a stacked piezoelectric actuator incorporating a stack of piezoelectric elements in a cylindrical casing;
a support plate for supporting the stacked piezoelectric actuator;
a cylindrical actuator cover holding a diaphragm presser and configured to transmit a piezoelectric displacement of the stacked piezoelectric actuator while accommodating the stacked piezoelectric actuator inside;
a fixing member screwed with a screw portion common to the screw portion and cooperating with the fixing ring to fix the position of the support plate in the accommodation recess.

Preferably, the fixing member is formed in a cylindrical shape and also serves as a guide member that guides the actuator cover so as to be movable toward and away from the diaphragm.

More preferably, the support plate is formed so as to cross the actuator cover through cutout portions formed at opposite portions of the actuator cover, so that both end portions of the support plate protrude from outer peripheral surfaces of the actuator cover, and both end portions of the support plate are sandwiched between the fixing ring and the fixing member.

A configuration may be adopted in which the diaphragm valve of the present invention further comprises an elastic member provided inside the actuator cover and interposed between the support plate and a receiving portion formed in the actuator cover to bias the actuator cover toward the diaphragm.

Preferably, a configuration may be adopted in which the inner peripheral surface of the fixing ring has a double hex structure, and the actuator cover passes through the fixing ring.

More preferably, a configuration may be adopted in which the actuator cover has a constant outer diameter from one longitudinal end to the other.

A configuration may be adopted in which the stacked piezoelectric actuator, the support plate, the actuator cover, the fixing member, and the elastic member constitute an actuator assembly that is detachable from the accommodation recess independently of the diaphragm.

The flow rate control device of the present invention uses the above-described diaphragm valve as a flow rate control valve for controlling a flow rate.

Advantageous Effects of Invention

According to the present invention, there is provided a diaphragm valve that is miniaturized while securing a required flow rate, and has improved assemble workability and maintainability, and a flow rate control device using the diaphragm valve as a flow rate control valve.

BRIEF DESCRIPTION OF DRAWINGS

FIG. 1A is an external perspective view of a flow rate control device according to an embodiment of the present invention.

FIG. 1B is a cross-sectional view of the main part of FIG. 1A.

FIG. 1C is a cross-sectional view showing a state in which an actuator assembly is removed from the body of the flow rate control device of FIG. 1B.

FIG. 2 is an external perspective view of a presser adapter.

FIG. 3A is an external perspective view of a fixing ring.

FIG. 3B is a plan view of the fixing ring in FIG. 3A.

FIG. 4 is a front view of a stacked piezoelectric actuator.

FIG. 5A is an external perspective view of a support plate.

FIG. 5B is a cross-sectional view of the support plate in FIG. 5A.

FIG. 6A is an external perspective view of an actuator cover.

FIG. 6B is a longitudinal cross-sectional view of the actuator cover in FIG. 6A.

FIG. 6C is an external perspective view showing a state in which a support plate is inserted into cutout portions of the actuator cover in FIG. 6A.

FIG. 7A is an external perspective view of a guide member (fixing member).

FIG. 7B is a longitudinal cross-sectional view of the guide member in FIG. 7A.

DESCRIPTION OF EMBODIMENTS

Embodiments of the present invention will be described below with reference to the drawings. In the description, the same elements are denoted by the same reference numerals, and redundant descriptions are omitted as appropriate.

A flow rate control device 1 according to the present embodiment is illustrated in FIGS. 1A to 1C.

In FIGS. 1A to 1C, 101 is an inlet-side block, 102 is an outlet-side block, 10 is a body, 20 is an actuator assembly, 110 is an open-close valve, 120 and 130 are pressure detectors.

The body 10 is formed into a block shape from a metallic material such as stainless-steel, defines a flow path 11 and a flow path 12, is placed on the inlet-side block 101, and is fixed with bolts (not shown).

The inlet-side block 101 is made of a metallic material such as stainless-steel, has a flow path 101a connected to the flow path 11, and has an opening of the flow path 101a formed on the lower surface thereof.

The outlet-side block 102 is made of a metallic material such as stainless-steel, is fixed to the side surface of the body 10 with bolts (not shown), has a flow path (not shown) connected to the flow path 12 formed therein, and has an opening of the flow path on the lower surface thereof.

FIG. 1C shows a state in which the actuator assembly 20 is detached from the body 10.

As shown in FIG. 1C, the body 10 is formed with an accommodation recess 15 having a circular cross section that opens at the upper surface of the body 10. The accommodation recess 15 is a circular bore with an inner diameter that is constant from the opening to the bottom surface 15c. At the bottom surface 15c of the accommodation recess 15, the flow path 11 and the flow path 12 are opened. The accommodation recess 15 has a constant inner diameter from the opening of the upper surface to the bottom surface 15c of the body 10, and a screw portion 15a is formed on the inner peripheral surface from the upper surface to the middle of the depth. In addition, a valve seat 15b formed of an annular projection is formed around the opening of the flow path 11 on the bottom surface 15c of the accommodation recess 15.

The diaphragm 40 is provided on the bottom surface 15c of the accommodation recess 15. An annular presser adapter 41 made of a metallic material such as stainless-steel as shown in FIG. 2 is provided on the outer peripheral portion of the diaphragm 40, and by using a fixing ring 42 pressing the presser adapter 41 toward the bottom surface 15c of the accommodation recess 15, the diaphragm 40 is fixed to the bottom surface 15c of the accommodation recess 15. Although the presser adapter 41 is used in the present embodiment, the diaphragm 40 can be directly fixed by the fixing ring 42 without using the presser adapter 41. In this case, it is preferable that a part of the fixing ring 42 that contacts the diaphragm 40 has a shape similar to that of the presser adapter 41.

In the present embodiment, the diaphragm 40 has a spherical shell shape in which an arc shape convex upward is a natural state by bulging a central portion of a laminated metal thin plate such as special stainless steel and a nickel-cobalt alloy thin plate. The diaphragm 40 cooperates with the bottom surface of the body 10 to define a flow path that connects the flow path 11 and the flow path 12, and changes the cross-sectional area of the flow path by elastically deforming and moving toward and away from the valve seat 15b. When the diaphragm 40 abuts against the valve seat 15b, the flow path is closed, the cross-sectional area of the flow path increases as the diaphragm 40 moves away from the valve seat 15b, and the flow rate of the fluid flowing through the flow path increases.

The fixing ring 42 is made of a metallic material such as stainless steel, and as shown in FIGS. 3A and 3B, a screw portion 42a is formed on the outer peripheral surface, and the inner peripheral surface 42b has a double hex configuration for engaging a rotating tool. By screwing the screw portion 42a of the fixing ring 42 with the screw portion 15a of the accommodation recess 15, the fixing ring 42 presses the presser adapter 41 toward the diaphragm 40, thereby fixing the diaphragm 40 to the bottom surface 15c of the accommodation recess 15. By fixing the diaphragm 40 to the body 10 using the fixing ring 42, the actuator assembly 20 can be detachably attached to the accommodation recess 15 independently of the diaphragm 40.

As will be described later, the actuator assembly 20 is attached to the accommodation recess 15 to open and close a diaphragm valve.

The diaphragm valve of the present invention comprises a body 10, a diaphragm 40, a presser adapter 41, a fixing ring 42, and an actuator assembly 20, which is used as a flow control valve for the flow rate control device 1.

The pressure detector 120 detects a pressure upstream of an orifice (not shown) provided in the middle of the flow path 12 inside the body 10.

The pressure detector 130 detects the pressure downstream of the orifice (not shown).

The flow rate control device 1 is a so-called pressure type flow rate control device, and includes a control circuit (not shown) composed of hardware such as a processor, a memory, and required software, and measures a flow rate of a fluid flowing through the flow path 12 based on a pressure P1 detected by the pressure detector 120 and a pressure P2 detected by the pressure detector 130, and drives and controls the above-described diaphragm valve so that a measured flow rate becomes a target flow rate.

The actuator assembly 20 is for operating and actuating the diaphragm 40 and includes a stacked piezoelectric actuator 22, a support plate 24, an actuator cover 26, a diaphragm presser 27, a guide member 28, a disc spring 30, a support pin 31, a spacer 32, an adjustment cap nut 33, an actuator receiver 34, and a lock nut 35.

As shown in FIG. 4, the stacked piezoelectric actuator 22 incorporates stacked piezoelectric elements (not shown) in a cylindrical casing 22a. The casing 22a is made of a metallic material such as stainless-alloy, and its hemispherical end face on a tip end portion 22b side and an end face on a base end portion 22c side are closed. By applying a voltage to the stacked piezoelectric elements and causing them to expand, the end face of the casing 22a on the tip end portion 22b side is elastically deformed due to the piezoelectric force, and the hemispherical tip end portion 22b is displaced in the longitudinal direction. For example, assuming that the largest stroke of the stacked piezoelectric elements is 2d, the total length of the stacked piezoelectric actuators 22 becomes L0 by applying a predetermined voltage V0 at which the elongation of the stacked piezoelectric actuators 22 becomes d in advance. When a voltage higher than the predetermined voltage V0 is applied, the total length of the stacked piezoelectric actuator 22 becomes L0+d at longest, and when a voltage lower than the predetermined voltage V0 (including no voltage) is applied, the total length of the stacked piezoelectric actuator 22 becomes L0−d at shortest. Therefore, the entire length from the tip end portion 22b to the base end portion 22c can be extended and contracted in the longitudinal direction. In the present embodiment, the tip end portion 22b of the stacked piezoelectric actuator 22 is hemispherical, but the present invention is not limited thereto, and the tip end portion 22b may be a flat surface.

Further, the method of applying the voltage to the stacked piezoelectric actuator 22 is not limited to the above-described application method, and other methods may be employed.

Further, the power supply to the piezoelectric elements of the stacked piezoelectric actuator 22 is performed through a power supply line (not shown) which is led out from the base end portion 22c of the casing 22a.

The support plate 24 is a plate member having a substantially rectangular outer shape formed of a metallic material such as stainless steel, and as shown in FIGS. 5A and 5B, a hemispherical recess 24a into which the tip end portion 22b of the stacked piezoelectric actuator 22 fits is formed in the central portion of the front side, and both end portions 24b, 24b are curved in an arc shape. A circular recess 24d into which the tip end portion of the support pin 31 is fitted is formed in a central portion of the rear surface of the support plate 24.

The actuator cover 26 is formed of a metallic material such as stainless steel, and is a bottomed cylindrical member having a constant outer diameter from an upper end portion to a lower end portion as shown in FIGS. 6A and 6B. Two cut-out portions 26a, 26a are formed at positions symmetrical with respect to the central axial line on the lower end side of the actuator cover 26, and a screw portion 26c with which the adjustment cap nut 33 and the lock nut 35 are screwed is formed on the outer periphery of the upper end side. Further, the actuator cover 26 has a receiving portion 26d that receives the disc spring 30 at a lower end portion thereof, and a screw hole 26e to which the support pin 31 is screwed is formed at a center portion of the receiving portion. Further, a mounting recess 26f in which the diaphragm presser 27 is mounted is formed on the lower end surface of the receiving portion 26d.

As can be seen from FIGS. 1B and 1C, the actuator cover 26 houses the stacked piezoelectric actuator 22 therein. The stacked piezoelectric actuator 22 housed in the actuator cover 26 needs to be supported by the support plate 24. For this reason, as shown in FIGS. 1B, 1C, and 6C, the support plate 24 is disposed so as to cross the actuator cover 26 through two cut-out portions 26a formed in opposed positions to each other, and so that both end portions 24b protrude outward from the outer peripheral surfaces of the actuator cover 26. As will be described later, when the position of the support plate 24 is fixed in the accommodation recess 15 of the body 10, the actuator cover 26 is movable with respect to the support plate 24 in the direction of the central axis of the actuator cover 26, but the rotation around the central axis is restricted by the engagement of the support plate 24 with the cut-out portion 26a.

The diaphragm presser 27 is made of a synthetic resin such as polyimide, has a tip end portion convexly curved, and abuts against the upper surface of the central portion of the diaphragm 40.

The guide member 28 is formed of a metallic material such as stainless steel, is a cylindrical member as shown in FIGS. 7A and 7B, and has a screw portion 28a formed on the lower end portion of the outer peripheral surface, and a holding groove 28b and a holding groove 28c for holding the O-ring OR in two places of the inner peripheral surface are formed. In the guide member 28, recesses 28d into which both ends 24b of the support plate 24 fit are formed at symmetrical positions with respect to the central axial line on the inner periphery of the lower end portion. As can be seen from FIG. 1B, the guide member 28 has the screw portion 28a screwed with the screw portion 15a of the accommodation recess 15 to hold the support plate 24 in cooperation with the fixing ring 42, to thereby function as a fixing member for fixing the position of the support plate 24 in the accommodation recess 15. In addition, the guide member 28 holds two O-rings OR, and the outer peripheral surface of the actuator cover 26 inserted into the guide member 28 slides with respect to the two O-rings OR, so that the actuator cover 26 is guided so as to be movable toward and away from the diaphragm 40.

The support pin 31 is made of a metal material such as stainless steel, and is screwed with the screw hole 26e of the receiving portion 26d of the actuator cover 26, thereby fixed to the receiving portion 26d.

As shown in FIG. 1B, the disc spring 30 has the support pin 31 inserted into a central portion thereof, and an annular spacer 32 is provided on the disc spring 30. When the support plate 24 is fixed to the body 10, the upper end side of the disc spring 30 abuts against the support plate 24 via the spacer 32, and the lower end side abuts against the receiving portion 26d, thereby causing the elastic restoring force constantly urge the actuator cover 26 (diaphragm presser 27) toward the diaphragm 40. Due to the elastic restoring force of the disc spring 30, the diaphragm 40 is pressed by the diaphragm presser 27 and pressed against the valve seat (see FIG. 1C), thereby closing a flow path.

As shown in FIG. 1B, the adjustment cap nut 33 is screwed with the screw portion 26c of the actuator cover 26, and a metallic actuator receiver 34 is disposed between the adjustment cap nut 33 and the actuator cover 26. The actuator receiver 34 is an annular member having a hole for leading a feed line for feeding power to the piezoelectric element of the stacked piezoelectric actuator 22, and is disposed at an upper end portion of the stacked piezoelectric actuator 22, and transmits the driving force of the stacked piezoelectric actuator 22 to the adjustment cap nut 33 and the actuator cover 26. As shown in FIG. 1B, when there is no gap between the adjustment cap nut 33 and the actuator receiver 34, the opening degree of the diaphragm valve is equivalent to the maximum stroke of the stacked piezoelectric actuator 22, for example, when a space exists between the adjustment cap nut 33 and the actuator receiver 34, the opening degree of the diaphragm valve is obtained by subtracting the length of the space from the maximum stroke. In this manner, the adjustment cap nut 33 adjusts the opening degree of the diaphragm valve.

The lock nut 35 is provided to lock the rotational position of the adjustment cap nut 33.

The assembly procedure of the actuator assembly 20 will now be described.

First, the support pin 31 is screwed and fixed to the screw hole 26e of the receiving portion 26d of the actuator cover 26 to which the diaphragm presser 27 is attached.

Then, the disc spring 30 is disposed on the outer periphery of the support pin 31, and the spacer 32 is disposed on the disc spring 30.

Next, the support plate 24 is inserted into the cutout portion 26a of the actuator cover 26. At this time, the tip end portion of the support pin 31 is fitted to the recess 24d on the rear surface of the actuator cover 26, so that the actuator cover 26 is positioned.

Next, the guide member 28 to which an O-ring OR is attached is provided on the outer periphery of the actuator cover 26, and both ends 24b of the support plate 24 are fitted in the recess 28d of the guide member 28.

Then, the lock nut 35 is screwed with the screw portion 26c of the actuator cover 26, the stacked piezoelectric actuator 22 is inserted into the actuator cover 26, and the tip end portion 22b of the stacked piezoelectric actuator 22 is engaged with the recess 24a of the support plate 24.

Next, after the actuator receiver 34 is disposed at the upper end portion of the actuator cover 26, the adjustment cap nut 33 is screwed with the screw portion 26c of the actuator cover 26.

The assembly of the actuator assembly 20 is completed by the above-described procedure.

The actuator assembly 20 is attached to the body 10 by inserting the actuator assembly 20 into the accommodation recess 15, screwing the guide member 28 with the screw portion 15a of the accommodation recess 15, and tightening the guide member 28. By loosening the guide member 28 and removing it from the body 10, the actuator assembly 20 is detached from the body 10.

In the diaphragm valve configured as described above, the gap between the valve seat 15b and the diaphragm 40, that is, the cross-sectional area of the flow path is controlled by controlling the voltage applied to the stacked piezoelectric actuator 22 of the actuator assembly 20. When the total length L0 of the stacked piezoelectric actuator 22 is extended, the actuator cover 26 moves in a direction away from the diaphragm 40 against the elastic restoring force of the disc spring 30, the gap between the valve seat 15b and the diaphragm 40 is widened, and the flow rate of the fluid flowing through the flow path is increased. When the voltage applied to the stacked piezoelectric actuator 22 is decreased or no voltage is applied, the actuator cover 26 moves in a direction approaching the diaphragm 40 by the elastic restoring force of the disc spring 30, and the flow rate of the fluid flowing through the flow path is decreased or the flow rate becomes zero.

According to the present embodiment, since the actuator assembly 20 is detachable from the accommodation recess 15 of the body 10 independently of the diaphragm 40, assemble workability and the maintainability are improved. In particular, since the actuator assembly 20 can be removed without removing the diaphragm 40 from the body 10, the flow path is not opened to the atmosphere. Thus, even if the actuator assembly 20 is removed from the accommodation recess 15 and then re-installed, there is no need to clean the interior of the flow path of the diaphragm valve.

According to the present embodiment, the diaphragm 40 is fixed in the accommodation recess 15 by the fixing ring 42 screwed with the screw portion 15a of the accommodation recess 15 of the body 10. In addition, a guide member 28 serving as a fixing member is screwed with the common screw portion 15a, and the position of the support plate 24 is fixed in the accommodation recess 15 by cooperation of the guide member 28 and the fixing ring 42. Furthermore, since the inner diameter of the accommodation recess 15 of the body 10 is constant from the opening to the bottom surface, the outer diameter of the diaphragm 40 can be large. As a result, it is possible to reduce the size of the diaphragm valve while securing the flow rate.

According to the present embodiment, since the inner peripheral surface of the fixing ring 42 has a double hex structure, the outer diameter of the actuator cover 26 passing through the fixing ring 42 can be made larger than that of the hex structure, and the structure of the actuator cover 26 can also be simplified.

According to the present embodiment, since the actuator cover 26 is formed into a cylindrical shape having a constant outer diameter and the diaphragm presser 27 is directly attached to the lower end of the actuator cover 26, it is possible to make the diaphragm presser 27 correspond to the diaphragm 40 having a larger diameter.

In the present embodiment, the diaphragm valve is applied to a flow rate control device of the pressure type, but the present invention is not limited to the flow rate control device of the pressure type, and the diaphragm valve of the present invention is also applicable to a flow rate control device including a thermal flow sensor using a heating resistor for measuring the flow rate.

In the present embodiment, the diaphragm valve is used as the flow control valve, but it can also be used as an open-close valve.

Although the embodiments of the present invention have been described in detail above, the present invention is not limited to such particular embodiments, and various modifications can be made within the scope of the gist of the present invention described in the claims.

REFERENCE SIGNS LIST

1: Flow rate control device
10: Body
11, 12: Flow path
15: Accommodation recess
15a: Screw portion
15b: Valve seat
15c: Bottom surface
20: Actuator assembly
22: Stacked piezoelectric actuator
22a: Housing
22b: Tip end portion
22c: Base end portion
24: Support plate
24a: Recess
24b: End portion
24d: Recess
26: Actuator cover
26a: Cut-out portion
26c: Screw portion
26d: Receiving portion
26e: Screw hole
26f: Mounting recess
28: Guide member (fixing member)
28a: Screw portion
28b, 28c: Holding groove
28d: Recess
30: Disc spring
31: Support pin
32: Spacer
33: Adjustment cap nut
34: Actuator receiver
35: Lock nut
40: Diaphragm
41: Presser adapter
42: Fixing ring
42a: Screw portion
42b: Inner peripheral surface
OR: O-ring
101: Inlet-side block
101a: Flow path
102: Outlet-side block
110: Open-close valve
120, 130: Pressure detector

The invention claimed is:

1. A diaphragm valve comprising:
a body having a block shape and defining a flow path;
a diaphragm provided on a bottom surface of an accommodation recess formed in the body and configured to change an opening degree of the flow path while defining a part of the flow path;

a fixing ring screwed with a screw portion formed on an inner peripheral surface of the accommodation recess to fix the diaphragm to the body;

a stacked piezoelectric actuator incorporating a stack of piezoelectric elements in a cylindrical casing;

a support plate for supporting the stacked piezoelectric actuator;

a cylindrical actuator cover holding a diaphragm presser and configured to transmit a piezoelectric displacement of the stacked piezoelectric actuator while accommodating the stacked piezoelectric actuator inside;

a fixing member screwed with a screw portion common to the screw portion and cooperating with the fixing ring to fix a position of the support plate in the accommodation recess.

2. The diaphragm valve according to claim 1, wherein the fixing member is formed in a cylindrical shape and also serves as a guide member that guides the actuator cover so as to be movable toward and away from the diaphragm.

3. The diaphragm valve according to claim 1, wherein the actuator cover has a constant outer diameter from one longitudinal end to the other.

4. A flow rate control device using the diaphragm valve as defined in claim 1 as a flow rate control valve for controlling a flow rate.

5. The diaphragm valve according to claim 1, wherein the support plate is arranged such that it crosses the actuator cover through cutout portions formed at opposite positions of the actuator cover, so that both end portions of the support plate protrude from outer peripheral surfaces of the actuator cover, and wherein both end portions of the support plate are sandwiched between the fixing ring and the fixing member.

6. The diaphragm valve according to claim 5, wherein the inner peripheral surface of the fixing ring has a double hex structure, and wherein the actuator cover passes through the fixing ring.

7. The diaphragm valve according to claim 1, further comprising an elastic member provided inside the actuator cover and interposed between the support plate and a receiving portion formed in the actuator cover to bias the actuator cover toward the diaphragm.

8. The diaphragm valve according to claim 7, wherein the stacked piezoelectric actuator, the support plate, the actuator cover, the fixing member, and the elastic member constitute an actuator assembly that is detachable from the accommodation recess independently of the diaphragm.

* * * * *